(12) United States Patent
Shadikhan (10) Patent No.: US 8,283,295 B1
(45) Date of Patent: Oct. 9, 2012

(54) OIL SOLIDS PRECIPITATION

(76) Inventor: Tajwar Shadikhan, Tai Po (HK)

( * ) Notice: Subject to any disclaimer, the term of this patent is extended or adjusted under 35 U.S.C. 154(b) by 746 days.

(21) Appl. No.: 12/070,726

(22) Filed: Feb. 20, 2008

Related U.S. Application Data (60) Provisional application No. 60/902,434, filed on Feb. 21, 2007.

(51) Int. Cl.
*B01D 21/00* (2006.01)
(52) U.S. Cl. ............... 508/111; 210/167.02; 210/167.06; 210/723; 210/737; 210/738; 210/178; 210/179; 208/179; 184/6.21; 184/6.24
(58) Field of Classification Search .................. 208/179; 210/167.02, 167.06, 723, 737, 738; 508/111; 184/6.21, 6.22, 6.24
See application file for complete search history.

(56) References Cited

U.S. PATENT DOCUMENTS

| | | | | |
|---|---|---|---|---|
| 1,056,928 A * | 3/1913 | Morris | ....................... | 210/195.1 |
| 1,506,115 A * | 8/1924 | Donaldson et al. | ........... | 516/138 |
| 1,744,610 A * | 1/1930 | Boykin | .......................... | 502/80 |
| 2,081,632 A * | 5/1937 | McBain | .......................... | 196/46 |
| 2,140,811 A * | 12/1938 | Poole | .............................. | 141/57 |
| 2,303,261 A * | 11/1942 | Dunmire | ..................... | 184/6.21 |
| 2,567,885 A * | 9/1951 | Jones | ........................... | 241/163 |
| 3,227,528 A * | 1/1966 | Jaeger | .......................... | 422/200 |
| 3,282,827 A * | 11/1966 | Grysiak, Jr. | .................... | 208/180 |
| 3,499,428 A * | 3/1970 | Stirling | ..................... | 123/196 R |
| 3,879,264 A * | 4/1975 | Seelbach | ..................... | 196/46.1 |
| 4,293,424 A * | 10/1981 | Baur et al. | .................... | 210/737 |
| 4,824,580 A * | 4/1989 | Standridge et al. | ........... | 210/708 |
| 4,876,015 A * | 10/1989 | McKibben | .................... | 210/695 |
| 4,938,876 A * | 7/1990 | Ohsol | .......................... | 210/708 |
| 5,299,657 A * | 4/1994 | Hikes | .......................... | 184/6.22 |
| 5,308,503 A * | 5/1994 | Strom | .......................... | 210/728 |
| 5,341,900 A * | 8/1994 | Hikes | .......................... | 184/6.12 |
| 5,434,330 A * | 7/1995 | Hnatow et al. | ................ | 585/864 |
| 5,820,748 A * | 10/1998 | Shadikhan | .................... | 208/179 |
| 5,975,245 A * | 11/1999 | Jephott et al. | .............. | 184/104.3 |
| 6,265,495 B1 * | 7/2001 | Hirata et al. | .................. | 525/404 |

(Continued)

OTHER PUBLICATIONS

U.S. Appl. No. 07/326,333, filed Mar. 1989, Shadikhan, Tajwar (specification and drawings), classified in 208/179.*

(Continued)

*Primary Examiner* — Duane Smith
*Assistant Examiner* — Ives Wu
(74) *Attorney, Agent, or Firm* — Christopher John Rudy (57) ABSTRACT

Precipitation vessel for precipitation of flocculants from lubricating oil includes a hollow housing having an interior volume capable of containing oil; an entry port capable of allowing oil to enter into the interior volume; a stirrer capable of stirring contained oil; a heater capable of heating the contained oil; a product exit port capable of allowing oil to exit the interior volume; an upper exterior access port; and a lower exterior access port. Contaminated lubricating oil can be cleaned from solid particulates by a method of providing a vessel for containing oil; providing contaminated lubricating oil to the vessel; contacting the contaminated lubricating oil with a coagulant, and, maintaining the resulting mixture at a mildly elevated temperature throughout the vessel, inducing flocculation of solid particles and settlement of flocculated particles under low thermo-current, if not thermo-current-free, conditions; and drawing off lubricating oil cleaned from settled flocculated solid particles. The vessel or method can be employed as part of a system for reclaiming used lubricating oil, which, for example, may also employ vacuum separation of gasses, water and solvents under mild temperature conditions.

20 Claims, 10 Drawing Sheets

U.S. PATENT DOCUMENTS

2006/0009657 A1* 1/2006 Yada et al. .................... 562/600
2008/0103271 A1* 5/2008 Mitchell ......................... 526/61

OTHER PUBLICATIONS

Zimmark Far East Limited, Hong Kong, brochure, Zimmark Technology, 8 pp., ca. 2005 A.D.

Greenkey Technology, "Lubrication Management Services," brochure, ca. 2007 A.D.

Greenkey Technology, "History of Greenkey Technology," brochure insert card, ca. 2007 A.D.

* cited by examiner

OIL SOLIDS PRECIPITATION

This claims the benefits provided under 35 USC 119(e) of U.S. provisional patent application No. 60/902,434 filed on Feb. 21, 2007 A.D. The complete specification of that application, of course to include its drawings, is incorporated herein by reference.

FIELD AND PURVIEW OF THE INVENTION

The invention generally concerns a vessel useful for precipitation of flocculants from oil. Of concern, too, can be a method to precipitate solid contaminants from contaminated lubricating oil, and a system employing the vessel or method in oil reclamation or restoration.

BACKGROUND TO THE INVENTION

Oil, in general, does not lose its lubricating properties with use. It does, however, become contaminated. It often then is considered unfit for further lubricating use and may be disposed of as waste oil.

In address of this problem, U.S. Pat. No. 5,820,748 to Shadikhan discloses safe removal of gasses, water and solvents from used lubricating oils with vacuum apparatus under mild temperature conditions. Removal of solids can be assisted by use of a coagulant. As effective as the technology of that disclosure is, improvements to the art would be welcome.

FULL DISCLOSURE OF THE INVENTION

The present invention provides a precipitation vessel for precipitation of flocculants from lubricating oil, which comprises a hollow housing having an interior volume capable of containing oil within the interior volume; an entry port capable of allowing oil to enter into the interior volume of the hollow housing; a stirrer capable of stirring contained oil within the interior volume of the housing; a heater capable of heating contained oil within the interior volume of the housing; a product exit port capable of allowing oil to exit the interior volume of the hollow housing; an upper exterior access port; and a lower exterior access port. In another aspect, contaminated lubricating oil is cleaned from solid particulates by a method for cleaning contaminated lubricating oil from solid particles, which comprises providing a vessel for containing oil; providing contaminated lubricating oil to the vessel; contacting the contaminated lubricating oil with a coagulant; and, maintaining the resulting mixture at a mildly elevated temperature throughout the vessel, inducing flocculation of solid particles and settlement of flocculated particles under low thermo-current, if not thermo-current-free, conditions; and drawing off lubricating oil cleaned from settled flocculated solid particles. The precipitation vessel or method for cleaning contaminated lubricating oil can be employed as part of a system for reclaiming used lubricating oil, which, for example, may also employ vacuum separation of gasses, water and solvents under mild temperature conditions.

The invention is useful in oil reclamation or restoration.

Significantly, by the invention, the art is advanced in kind. In particular, solid particulates in contaminated used lubricating oil can be separated from the remaining oil stock with its existing additives efficiently and economically, without damage to the oil or its existing additives. And, the present invention can increase efficiency of coagulation of solid particulates such as disclosed in the '748 patent to Shadikhan. The oil may be subject to further treatment to remove gasses, water and solvents, which may be followed by restoration of any deficient or lacking additives to bring the oil to the desired specifications. Thus cleaned, treated and restored, lubricating oil can be reused repeatedly.

Numerous further advantages attend the invention.

The drawings form part of the specification hereof. With respect to the drawings, which are not necessarily drawn to scale, the following is briefly noted:

FIGS. 8A-8I show inner and outer top and bottom manhole lids of the vessel of FIG. 1, with FIG. 8A a side view of the precipitation vessel inner manhole top lid; FIG. 8B a top view of the lid of FIG. 8A; FIG. 8C the precipitation vessel outer manhole top lid; FIG. 8D a top view of the lid of FIG. 8C; FIG. 8F a side view of an outside of FIG. 8E; FIG. 8G a side view a side of the lid of FIG. 8E; FIG. 8H a side view of an outside of the precipitation vessel inner manhole bottom lid; and FIG. 8I a side view of a side of the lid of FIG. 8H.

FIGS. 9A-9E show some heating, stirring and coagulant entry features of the vessel of FIG. 1, with FIG. 9A a side plan view of such features.

The invention can be further understood by the detail set forth below, which may be read in view of the drawings. As with the disclosure of the invention already set forth above, such is to be taken in an illustrative and not necessarily limiting sense.

With reference to the drawings, precipitation vessel 100 includes hollow housing 10 made, for example, of steel, having interior volume 11 that is capable of containing oil within it; the housing 10 may be in a generally cylindrical shape, which has top 12, sides 13 and bottom 14, and it may form an inner vessel contained within outer housing 15. Between the housings 10, 15 may be thermal insulation 16. Entry port 20 can allow for entry of oil into the interior volume 11, for example, by operation of a pump. Stirrer 30 can be employed to stir contained oil within the interior volume 11, and it may include rotating shaft 31, propellers 32, and motor 33, and be associated with top and bottom perforation plates 34, 35. Heater 40 can heat contained oil within the interior volume 11, and may include electric resistance heater 41, and hot fluid circulation such as hot air, heated by hot air heater 42 and circulated through metal circulation pipe 43. The arrangement and operation of the stirrer 30 and heater 40 can provide for low thermo-current if not thermo-current-free conditions, which are highly efficient for coagulating or flocculating solids from the oil, for example, at a uniform temperature of about eighty-five degrees C., or less, for a suitable amount of time for a full batch of used motor oil within the interior volume 11. Product exit port 50 can allow oil to exit the interior volume 11, for example, by operation of another pump, and it is through the port 50 that lubricating oil, cleaned of solid particulates, can be drawn for further processing and/or holding by additional equipment 57, for example, extraction system 57E and holding vessel 57H such as disclosed by the '748 patent to Shadikhan, as may be desired. Upper exterior access port 60 can be provided through outer and inner manhole covers 61, 62, and may include coagulant entry port 63. Lower exterior access port 70 can be provided through outer and inner manhole covers 71, 72. Sludge can be removed from the interior volume 11 at any suitable time, for instance, after removal of the lubricating oil that is cleaned of solid particulates. Control box 80 can be employed to control and monitor the oil inside the interior volume, and may be employed in connection with addition of additives. The following is also noted with respect to various figures:

| FIG. | Ref. Numeral | Note |
|---|---|---|
| 2 | 10 | Precipitation vessel (4-mm steel) |
| 2 | 10' | Precipitation vessel inner layer (3-mm steel) |
| 2, 3 | 10B | Set bolt (Ø 20 mm) |
| 2 | 10F | Fixture (40-mm × 40-mm angle steel) |
| 2 | 10H | Door hinge (noting outer manhale cover 71) |
| 2 | 10L | Supporting leg (120 mm × 50 mm × 5 mm × 4 P iron channel) |
| 2 | 15 | Precipitation vessel outer layer (3-mm steel) |
| 2, 7 | 16 | Rock wool insulation (10 cm) |
| 2 | 16' | Insulation wood (50 mm × 50 mm) |
| 2, 5, 6 | 20 | Oil inlet pipe (Ø 50 mm) |
| 2 | 40/42 | Heater for hot air circulation (3 P × 800 W) |
| 2, 6 | 40/42B | Hot air circulation fan box (25 cm × 14 cm × 14 cm) |
| 2 | 40/42F | Hot air circulation fan (2 P × 50 W) |
| 2, 5, 6 | 43 | Hot air circulation pipe (Ø 50 mm) |
| 2 | 43' | Hot air circulation pipe (Ø 60 mm) |
| 2, 6 | 43" | Hot air circulation pipe (Ø 88 mm) |
| 2 | 44 | Heat pressure relief valve (Ø 50 mm) |
| 2, 6 | 50 | Oil outlet pipe (Ø 88 mm) |
| 2 | 50F | Flange joint (Ø 20 × 1 cm) |
| 2, 3 | 80 | Electrical control panel (40 cm × 30 cm × 20 cm) |
| 2 | D1 | Dimension (Ø 217.5 cm) |
| 2 | D2 | Dimension (104 cm) |
| 2 | D3 | Dimension (4 cm) |
| 2 | D4 | Dimension (40 cm) |
| 2 | D5 | Dimension (12.5 cm) |
| 2 | D6 | Dimension (Ø 198 cm) |
| 2 | D7 | Dimension (Ø 178 cm) |
| 2 | D8 | Dimension (Ø 60 cm) |
| 2 | D9 | Dimension (Ø 50 cm) |
| 2 | D10 | Dimension (15 cm) |
| 2 | D11 | Dimension (135.1 cm) |
| 2 | D12 | Dimension (204 cm) |
| 2 | D13 | Dimension (224 cm) |
| 2 | D14 | Dimension (243 cm) |
| 2 | D15 | Dimension (47 cm) |
| 2 | D16 | Dimension (3 cm) |
| 2 | D17 | Dimension (4 cm) |
| 2 | R1 | Radius (1.5 cm) |
| 2 | R2 | Radius (27.5 cm) |
| 2 | R3 | Radius (24 cm) |
| 3 | 12F | Upper frame (80-mm × 40-mm × 5-mm iron channel) |
| 3 | 60 | Top manhole for stirrer (coagulant and additives) |
| 3 | D18 | Dimension (78 cm) |
| 3 | D19 | Dimension (4 cm) |
| 3 | D20 | Dimension (70 cm) |
| 3 | D21 | Dimension (12 cm) |
| 3 | D22 | Dimension (20 cm) |
| 2 | D23 | Dimension (20 cm) |
| 3 | D24 | Dimension (14 cm) |
| 3 | D25 | Dimension (28 cm) |
| 3 | R4 | Radius (30 cm) |
| 3 | R5 | Radius (25 cm) |
| 3 | R6 | Radius (70 cm) |
| 3 | R7 | Radius (23.5 cm) |
| 4 | 14F | Bottom frame (100-mm × 40-mm × 5-mm iron channel) |
| 4 | 14P | Supporting plate (10-mm steel) |
| 4 | D26 | Dimension (40 cm) |
| 4 | D27 | Dimension (20 cm) |
| 4 | D28 | Dimension (14 cm) |
| 4 | D29 | Dimension (103.65 cm) |
| 4 | D30 | Dimension (10 cm) |
| 4 | R8 | Radius (30 cm) |
| 5 | 43H | Hot air circulation bole (Ø 0.5 mm * 59 P) |
| 5 | 43H' | Hot air circulation hole (Ø 0.5 mm * 97 P) |
| 5 | A1 | Angle (25 degrees) |
| 5 | D31 | Dimension (75.5 cm) |
| 5 | R9 | Radius (50 cm) |
| 5 | R10 | Radius (86 cm) |
| 5 | R11 | Radius (99 cm) |
| 5 | R12 | Radius (89 cm) |
| 5 | R13 | Radius (75 cm) |
| 6 | 10H | Heat insulation board (10-mm steel) |
| 6 | 10L' | Supporting legs (120 mm × 50 mm × 3 P iron channel) |
| 6 | 10P | Precipitation vessel positioner (10-mm steel) |
| 6 | A2 | Angle (37 degrees) |
| 6 | A3 | Angle (25 degrees) |
| 6 | D32 | Dimension (14 cm) |
| 6 | D33 | Dimension (8 cm) |
| 6 | D34 | Dimension (Ø 55 cm) |
| 6 | D35 | Dimension (18 cm) |
| 6 | D36 | Dimension (25 cm) |
| 6 | D37 | Dimension (34.63 cm) |
| 6 | D38 | Dimension (18 cm) |
| 6 | D39 | Dimension (44 cm) |
| 6 | D40 | Dimension (32.17 cm) |
| 7 | 14F | Bottom frame (5-cm × 5-cm timber) |
| 7 | D41 | Dimension (80 cm) |
| 7 | D42 | Dimension (5 cm) |
| 8A | D43 | Dimension (3.5 cm) |
| 8A | D44 | Dimension (12 cm) |
| 8A | D45 | Dimension (1.5 cm) |
| 8B | R14. | Radius (24.5 cm) |
| 8B | D46 | Dimension (1 cm) |
| 8B | D47 | Dimension (6.5 cm) |
| 8C | D48 | Dimension (0.5 cm) |
| 8C | D49 | Dimension (12 cm) |
| 8C | D50 | Dimension (9.5 cm) |
| 8D | R15 | Radius (30 cm) |
| 8D | D51 | Dimension (2 cm) |
| 8D | R16 | Radius (24.5 cm) |
| 8E | R17 | Radius (31.5 cm) |
| 8E | R18 | Radius (26.5 cm) |
| 8F | R19 | Radius (31.5 cm) |
| 8G | D52 | Dimension (Ø 53 cm) |
| 8G | D53 | Dimension (5 cm) |
| 8H | R20 | Radius (23.75 cm) |
| 8I | D54 | Dimension (1.5 cm) |
| 9A | 31 | Stirrer shaft (Ø 2 cm) |
| 9A | 31A | Stirrer shaft adjustable tube (Ø 28 mm) |
| 9A | 31C | Shaft coupling |
| 9A, 9D | 32 | Stirrer propeller (3-mm steel) |
| 9A | 32C | Casing pipe of stirrer propeller (Ø 5 cm × 6 cm) |

-continued

| FIG. | Ref. Numeral | Note |
|---|---|---|
| 9A | 33 | Stirrer motor (0.125 HP, 100 rpm) |
| 9A, 9C | 34 | Top perforation plate (5-mm steel) |
| 9A, 9E | 35 | Base (bottom) perforation plate (5-mm steel) |
| 9A | 41 | Electric heater ((2.5 KW × 3p) × 2) |
| 9A | 41C | Heater casing (Ø 60 mm) |
| 9A, 9B | 60L | Upper access port lid (4-mm steel) |
| 9A | D55 | Dimension (Ø 60 cm) |
| 9A | D56 | Dimension (36 cm) |
| 9A | D57 | Dimension (4 cm) |
| 9A | D58 | Dimension (180 cm) |
| 9A | D59 | Dimension (115 cm) |
| 9A | D60 | Dimension (100 cm) |
| 9A | D61 | Dimension (Ø 42 cm) |
| 9A | D62 | Dimension (2 cm) |
| 9B | D63 | Dimension (14 cm) |
| 9B | R21 | Radius (30 cm) |
| 9B | R22 | Radius (3 cm) |
| 9B | R23 | Radius (5 cm) |
| 9C, 9E | R24 | Radius (21 cm) |
| 9C, 9E | R25 | Radius (3 cm) |
| 9C, 9E | R26 | Radius (0.5 cm) |
| 9D | R27 | Radius (12.89 cm) |
| 9E | R28 | Radius (1.5 cm). |

Figure 1:
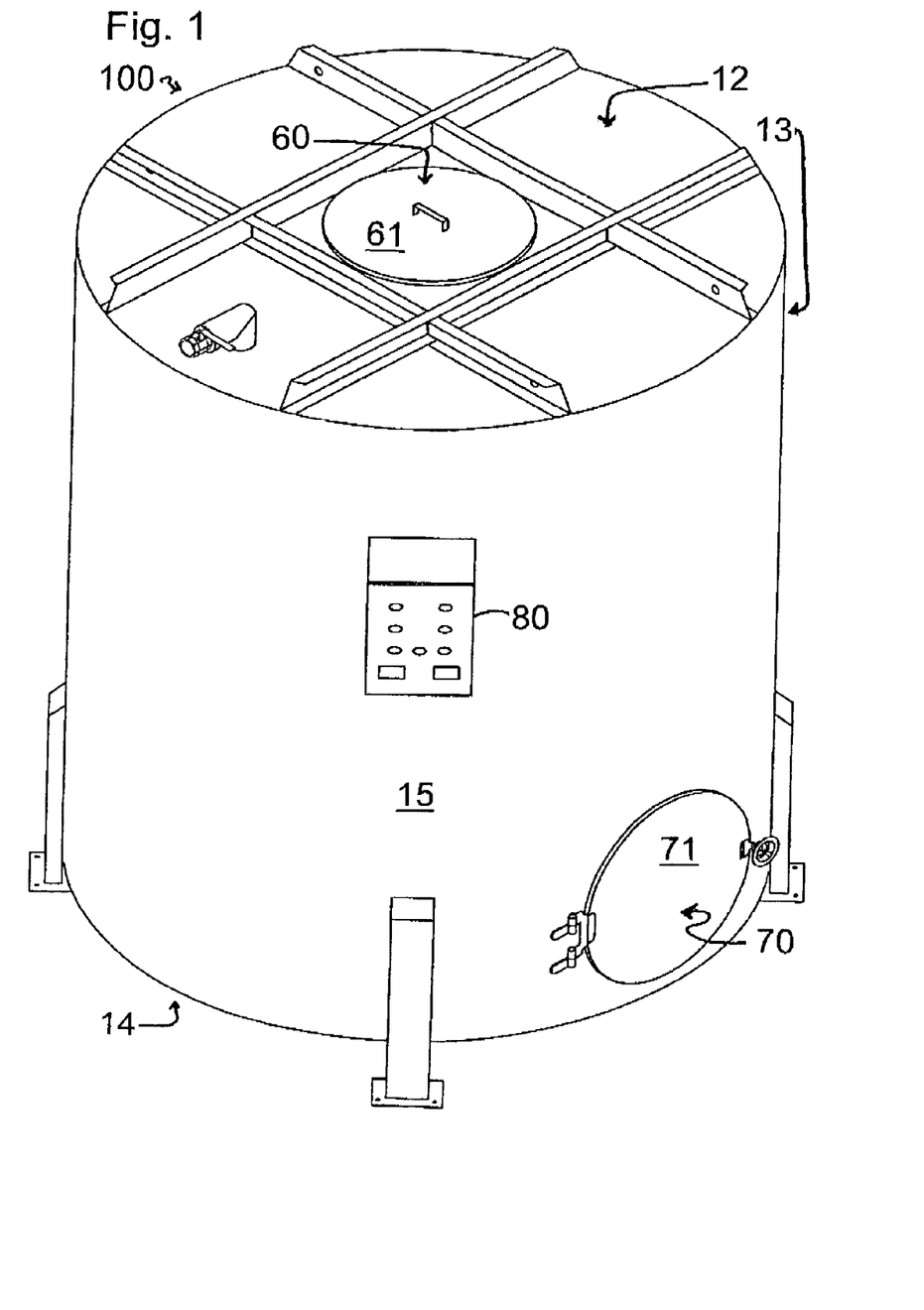
FIG. 1 is a front perspective view of a precipitation vessel of the present invention.
Figure 2:
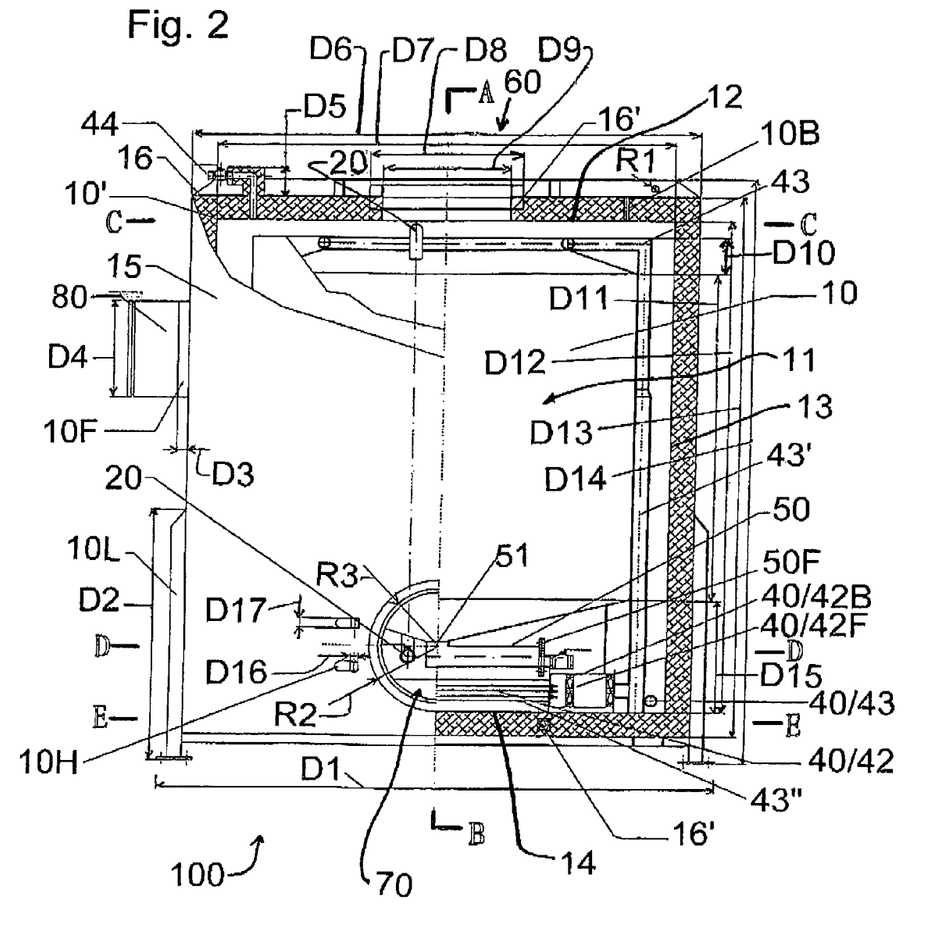
FIG. 2 is a front, plan view of the vessel of FIG. 1.
Figure 3:
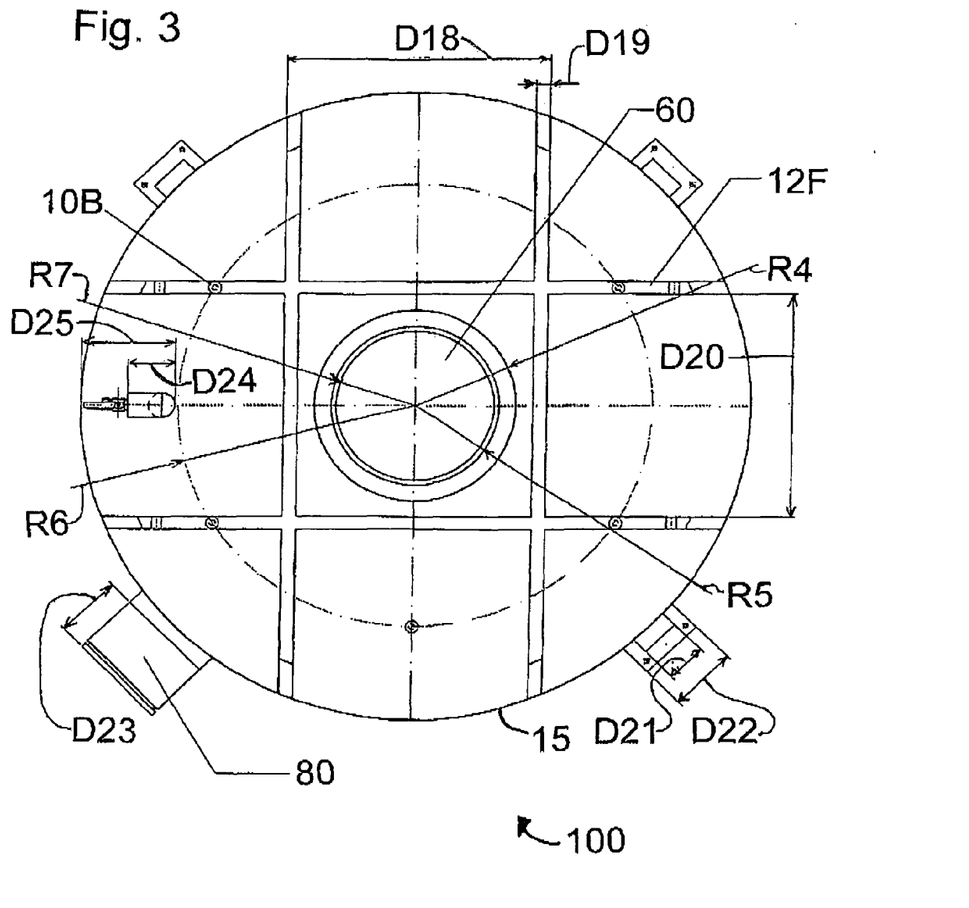
FIG. 3 is a top view of the vessel of FIG. 1, taken in the direction of arrow "A."
Figure 4:
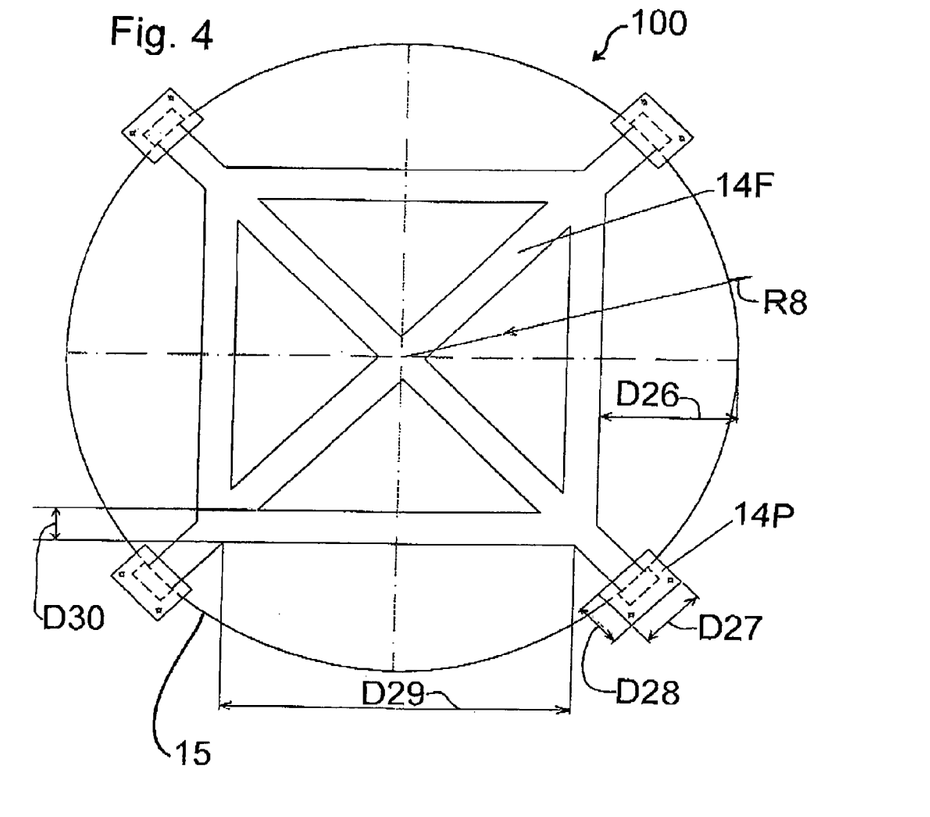
FIG. 4 is a bottom view of the vessel of FIG. 1, taken in the direction of arrow "B."
Figure 5:
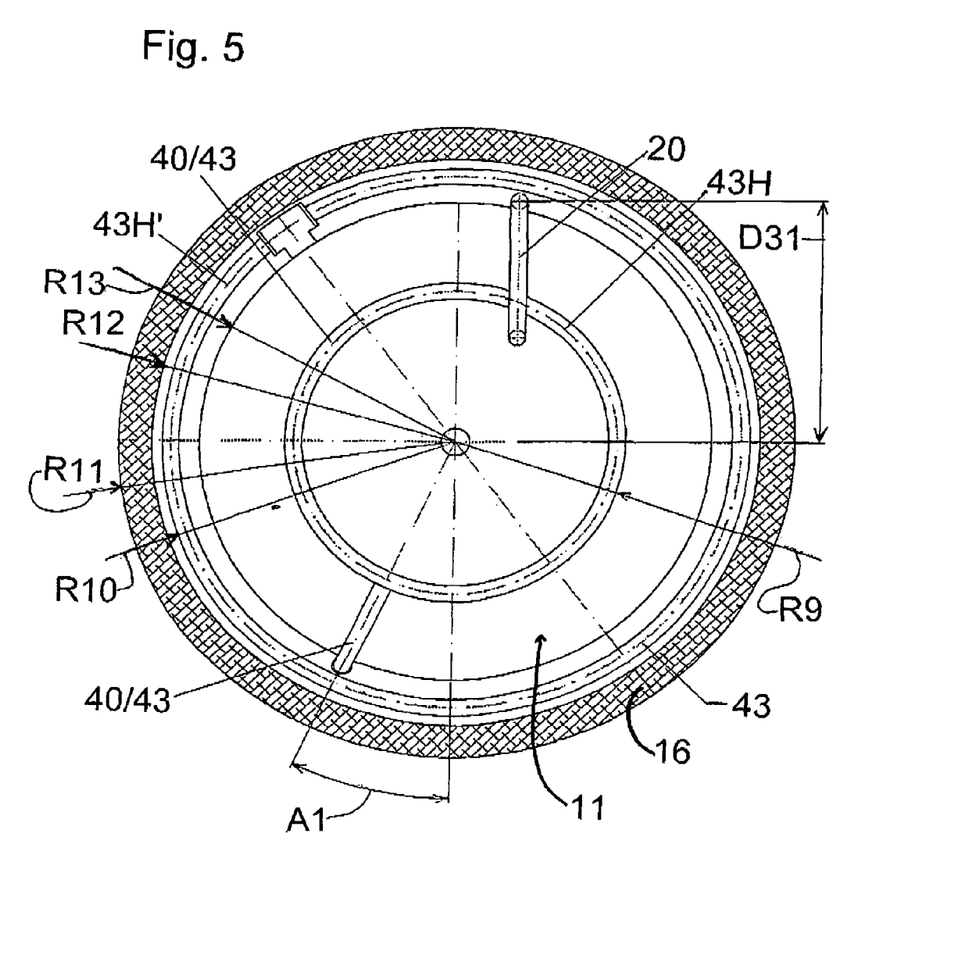
FIG. 5 is a sectional view of the vessel of FIG. 1, taken generally along "C-C."
Figure 6:
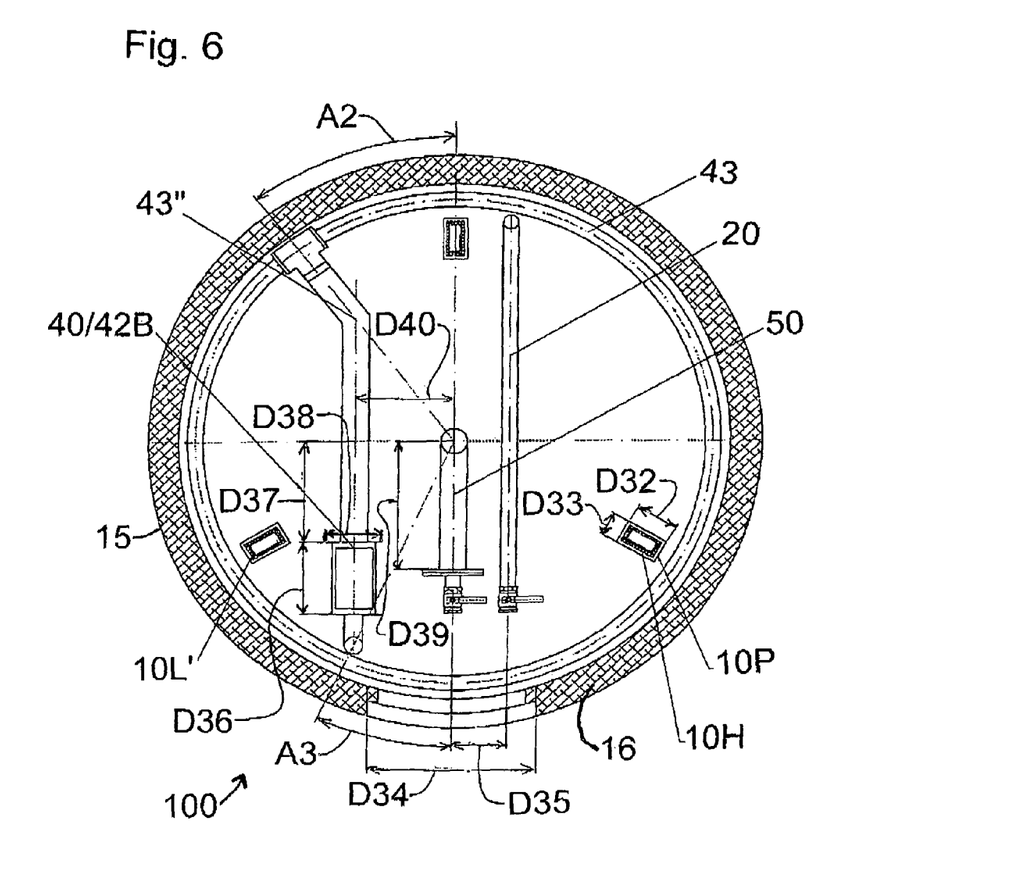
FIG. 6 is a sectional view of the vessel of FIG. 1, taken generally along "D-D."
Figure 7:
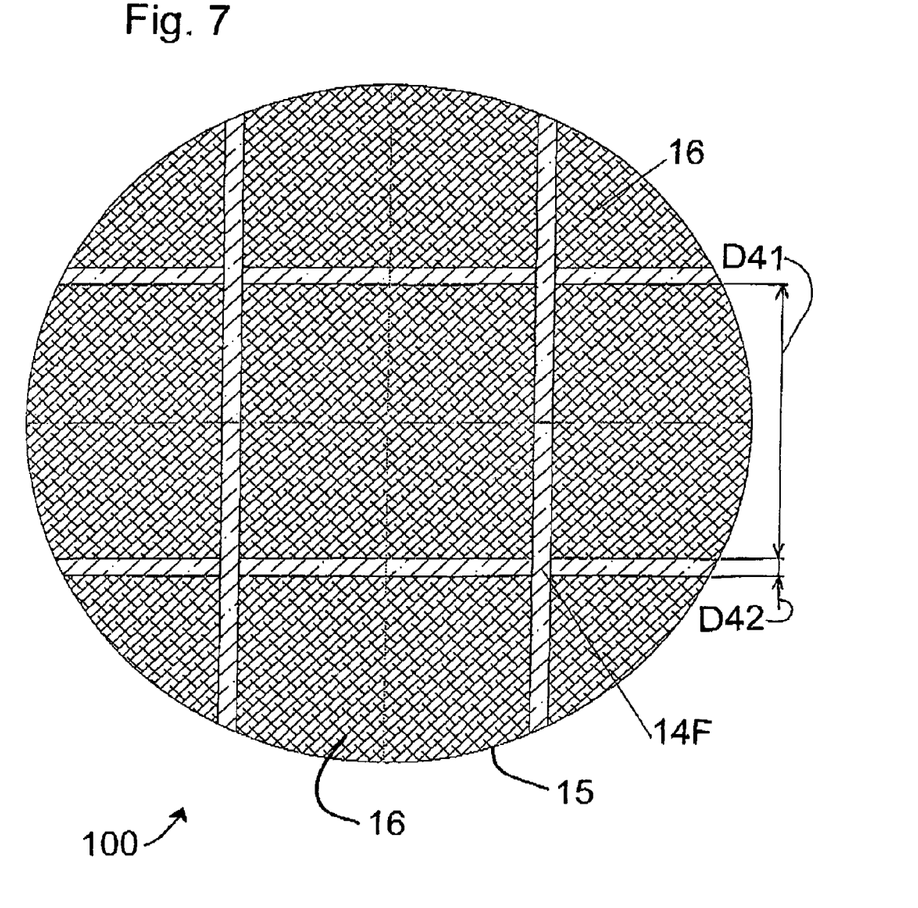
FIG. 7 is a sectional view of the vessel of FIG. 1, taken generally along "E-E."
Figures 8A, 8B:
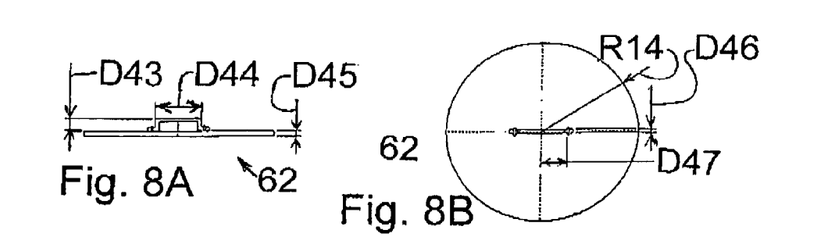
Figures 8C, 8D:
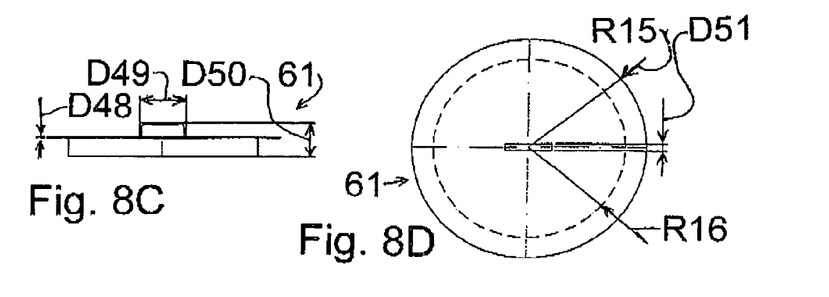
Figure 8E:
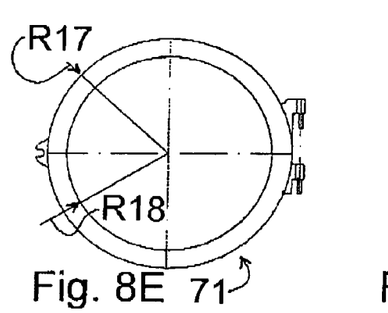
FIG. 8E a side view of an inside of the precipitation vessel outer manhole bottom lid.
Figures 8F, 8G:
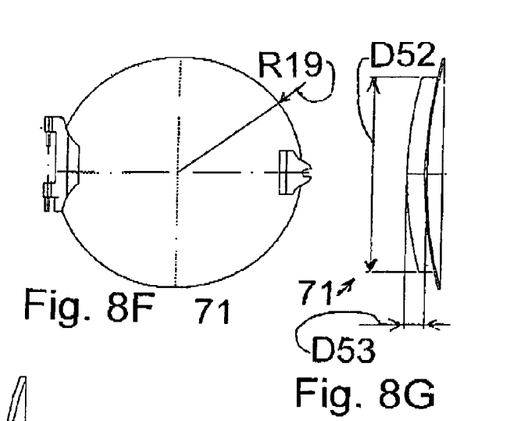
Figures 8H, 8I:
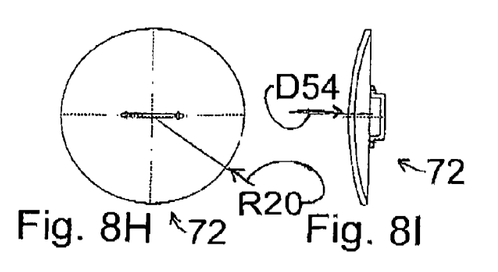
Figure 9A:
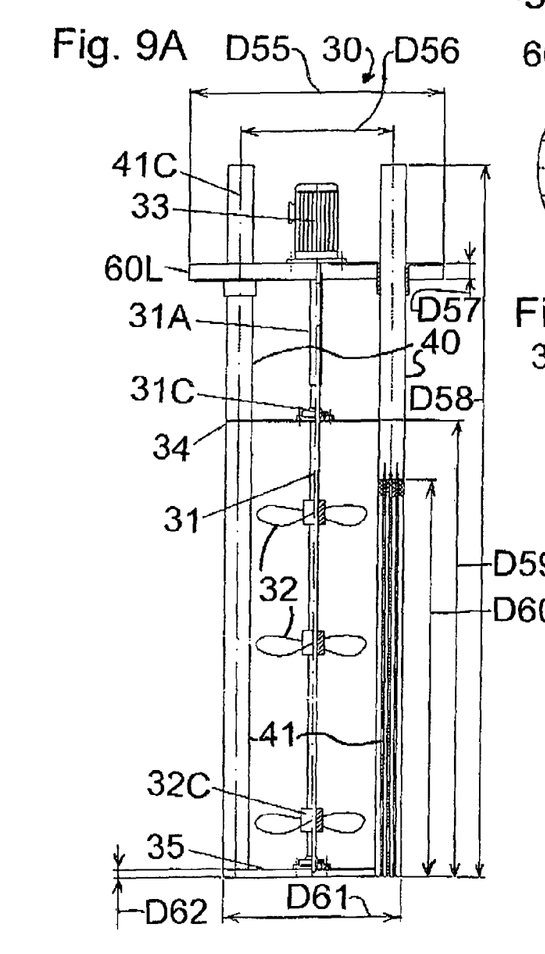
Figure 9B:
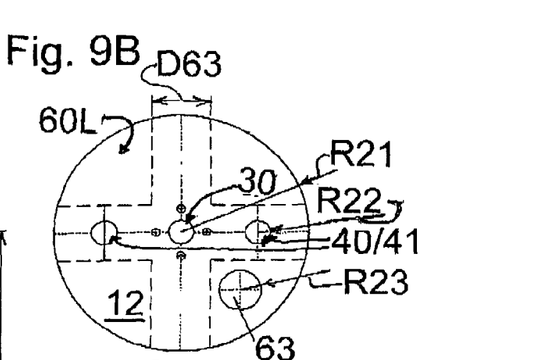
FIG. 9B a top view of the upper lid found in FIG. 9A.
Figure 9C:
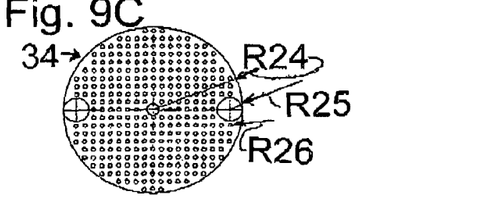
FIG. 9C a to view of the upper perforation plate found in FIG. 9A.
Figure 9D:
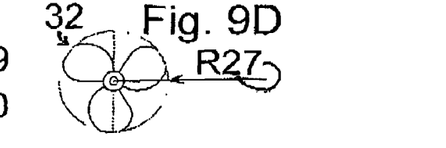
FIG. 9D a top view of a propeller found in FIG. 9A.
Figure 9E:
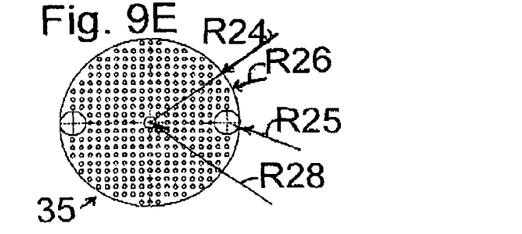
FIG. 9E a top view of the bottom perforation plate found in FIG. 9A.
Figure 10:
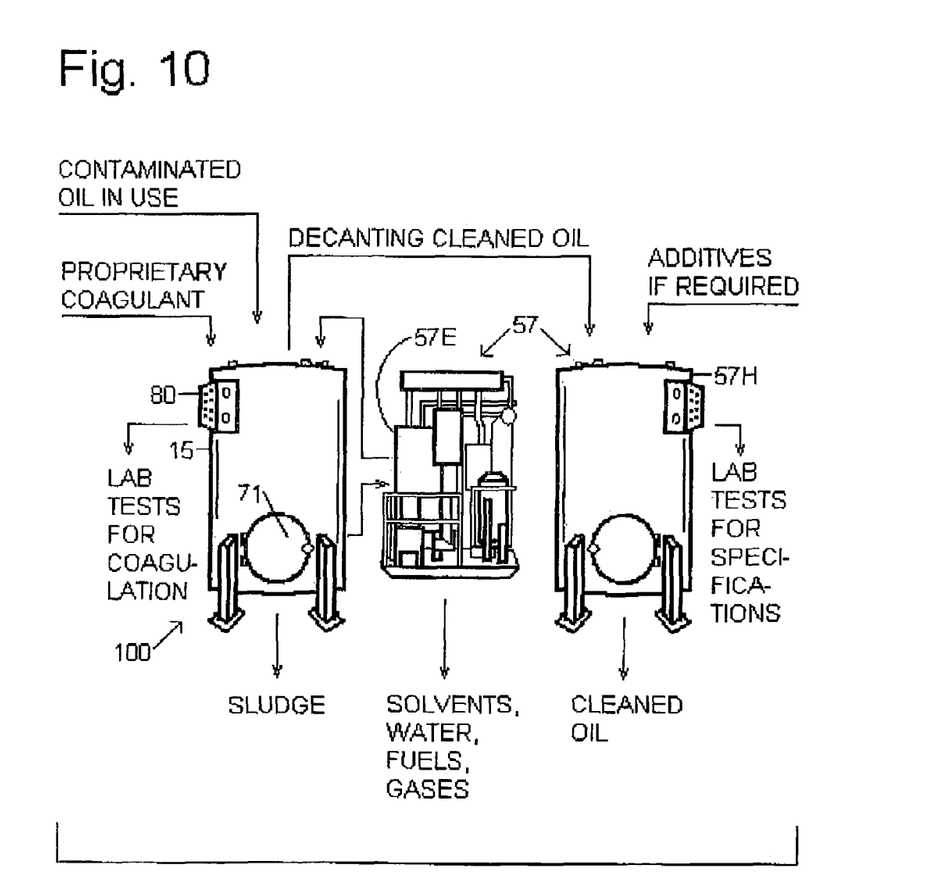
FIG. 10 shows the vessel of FIG. 1 as part of an oil-reclamation system, which includes removal of gasses, water and solvents such as by the disclosure of the '748 patent to Shadikhan.

And, with respect to FIG. 10, which includes a flow chart, the vessel 100 is typically 2,500 liters. Other sizes, for example, 800-liter, 3,000-liter 5,000-liter and 10,000-liter can be provided. The 2,500-liter vessel 100 goes well in standard containers for easy shipping. Solid carbonized substances are removed with coagulant in the vessel 100 at given "constant" temperature of the oil under treatment, within the insulated vessel 100. This is crucial to allow the sediments to settle down in a "current-free" environment. A slight variation of the oil or surrounding heated air temperature will render the flocculated solid particles suspended rather than precipitated. The system may be 100% environmentally friendly, with oil entirely processed below 85° C.

The method for cleaning contaminated lubricating oil from solid particles may employ the vessel 100 or another suitable vessel for containing oil, to which contaminated lubricating oil is introduced, and in which the coagulant is provided at any suitable time, before, during or after introduction of the oil. Any suitable coagulant may be employed. The resulting mixture can be maintained at a mildly elevated temperature throughout the vessel, i.e., mild temperature conditions, to include at a temperature of about eighty-five degrees C., or less, which can include temperatures between about sixty degrees C. and about eighty-five degrees C., for a suitable time, which may include times about from one to twenty-four hours, during which flocculation of solid particles and settlement of flocculated particles is induced under low thermo-current, if not essentially or nearly completely thermo-current-free, conditions. Lubricating oil cleaned from settled flocculated solid particles can be drawn off. If desired, such drawn off oil can be subjected to additional processing; for example, if not carried out prior to cleaning from solid particles, it may be extracted of gasses, water and solvents with vacuum under mild temperature conditions.

Accordingly, contaminants such as oxidized gums, lacquers and other carbonized materials of micron and submicron size, and other impurities such as coke and dirt particles, can be most effectively removed from the oil, and, by further processing such as by the disclosure of the '748 patent to Shadikhan, water, solvents and gasses can be removed also.

The oil may be restored to the desired specifications such as in regards to viscosity, TBN, TAN, flash point, delectrol value, and so forth.

CONCLUSION TO THE INVENTION

The present invention is thus provided. Various feature(s), part(s), step(s), subcombination(s) and/or combination(s) may be employed with or without reference to other feature(s), part(s), step(s), subcombination(s) and/or combination(s) in the practice of the invention, and numerous adaptations and modifications can be effected within its spirit, the literal claim scope of which is particularly pointed out as follows:

What is claimed is:

1. A precipitation vessel for precipitation of flocculants from lubricating oil, which comprises:
   a hollow housing having a top, sides, and a bottom, with an interior volume capable of containing oil within the interior volume;
   an entry port capable of allowing oil to enter into the interior volume of the hollow housing;
   a product exit port capable of allowing oil to exit the interior volume of the hollow housing;
   an upper exterior access port;
   a lower exterior access port; and
   means for providing low thermo-current if not thermo-current-free conditions, which are highly efficient for coagulating or flocculating solids from the oil at a uniform temperature of about eighty-five degrees C., or less, for a suitable amount of time for a full batch of used motor oil within the interior volume.

2. The vessel of claim 1, wherein a hot air heater is provided as part of said means, to heat air to be circulated through a circulation pipe that provides for circulation of hot air therethrough to heat contained oil within the interior volume of the housing.

3. The vessel of claim 1, wherein the vessel can contain from 800 to 10,000 liters.

4. The vessel of claim 1, which further comprises a coagulant entry port in addition to the entry port capable of allowing oil to enter into the interior volume of the hollow housing.

5. The vessel of claim 1, which further comprises additional processing equipment that includes an extraction system, wherein access of oil to the additional processing equipment is provided through the product exit port.

6. The vessel of claim 2, which further comprises additional processing equipment that includes an extraction system, wherein access of oil to the additional processing equipment is provided through the product exit port.

7. The vessel of claim 3, which further comprises additional processing equipment that includes an extraction system, wherein access of oil to the additional processing equipment is provided through the product exit port.

8. The vessel of claim 4, which further comprises additional processing equipment that includes an extraction system, wherein access of oil to the additional processing equipment is provided through the product exit port.

9. A method for cleaning contaminated lubricating oil from solid particles, which comprises providing a vessel for containing oil; providing contaminated lubricating oil to the vessel; contacting the contaminated lubricating oil with a coagulant, and, while maintaining the resulting mixture at a mildly elevated temperature uniform throughout the lubricating oil of about eighty-five degrees C. or less throughout the vessel, inducing flocculation of solid particles and settlement of flocculated particles under low thermo-current, if not thermocurrent-free, conditions; and drawing off lubricating oil cleaned from settled flocculated solid particles.

10. The method of claim 9, wherein the vessel is for precipitation of flocculants from lubricating oil, which embraces:
- a hollow housing having an interior volume capable of containing oil within the interior volume;
- an entry port capable of allowing oil to enter into the interior volume of the hollow housing;
- a stirrer capable of stirring contained oil within the interior volume of the housing;
- a heater capable of heating contained oil within the interior volume of the housing;
- a product exit port capable of allowing oil to exit the interior volume of the hollow housing;
- an upper exterior access port; and
- a lower exterior access port.

11. The method of claim 9, which further comprises vacuum separation of gasses, water and solvents from the lubricating oil cleaned from settled flocculated solid particles, under the same mildly elevated temperature as that employed for inducing flocculation.

12. The method of claim 10, which further comprises vacuum separation of gasses, water and solvents from the lubricating oil cleaned from settled flocculated solid particles, under the same mildly elevated temperature as that employed for inducing flocculation.

13. A precipitation vessel for precipitation of flocculants from lubricating oil, which comprises:
- a hollow housing having a top, sides, and a bottom, with an interior volume capable of containing oil within the interior volume;
- an entry port capable of allowing oil to enter into the interior volume of the hollow housing;
- a stirrer capable of stirring contained oil within the interior volume of the housing;
- a heater capable of heating contained oil within the interior volume of the housing;
- a product exit port capable of allowing oil to exit the interior volume of the hollow housing;
- an upper exterior access port; and
- a lower exterior access port—
- wherein the housing has a generally cylindrical shape, and forms an inner vessel contained within an outer housing; between the housing forming the inner vessel and the outer housing is thermal insulation; a first pump provides for entry of oil into the interior volume through the entry port; the stirrer includes a rotating shaft, propellers, and a motor, and is associated with top and bottom perforation plates; the heater includes an electric resistance heater, and a circulation pipe that provides for circulation of hot fluid therethrough; a second pump provides for exit of oil from the interior volume through the product exit port; the upper exterior access port is provided through an outer and inner first manhole cover set, and includes a coagulant entry port; and the lower exterior access port is provided through an outer and inner second manhole cover set.

14. The vessel of claim 13, wherein a hot air heater is provided as part of the heater to heat air to be circulated through the circulation pipe.

15. The vessel of claim 13, which further comprises a control box for controlling and monitoring the oil inside the interior volume.

16. The vessel of claim 13, which further comprises additional processing equipment that includes an extraction system, wherein access of oil to the additional processing equipment is provided through the product exit port.

17. The vessel of claim 14, which further comprises additional processing equipment that includes an extraction system, wherein access of oil to the additional processing equipment is provided through the product exit port.

18. The vessel of claim 15, which further comprises additional processing equipment that includes an extraction system, wherein access of oil to the additional processing equipment is provided through the product exit port.

19. A precipitation vessel for precipitation of flocculants from lubricating oil, which comprises:
- a hollow housing having a top, sides, and a bottom, with an interior volume capable of containing oil within the interior volume;
- an entry port capable of allowing oil to enter into the interior volume of the hollow housing;
- a stirrer, which is associated with at least one perforation plate, and which is capable of stirring contained oil within the interior volume of the housing;
- a heater capable of heating contained oil within the interior volume of the housing;
- a product exit port capable of allowing oil to exit the interior volume of the hollow housing;
- an upper exterior access port; and
- a lower exterior access port.

20. The vessel of claim 19, which further comprises additional processing equipment that includes an extraction system, wherein access of oil to the additional processing equipment is provided through the product exit port.

* * * * *